(12) United States Patent
Teo et al.

(10) Patent No.: US 9,673,709 B1
(45) Date of Patent: Jun. 6, 2017

(54) BUCK CONVERTER ELECTRONIC DRIVER WITH ENHANCED ITHD

(71) Applicant: Infineon Technologies Austria AG, Villach (AT)

(72) Inventors: Yong Siang Teo, Singapore (SG); Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/958,737

(22) Filed: Dec. 3, 2015

(51) Int. Cl.
| H02M 7/217 | (2006.01) |
| H02M 3/156 | (2006.01) |
| H02M 3/158 | (2006.01) |
| H05B 33/08 | (2006.01) |

(52) U.S. Cl.
CPC ........ H02M 3/158 (2013.01); H05B 33/0815 (2013.01); H05B 33/0845 (2013.01)

(58) Field of Classification Search
CPC ........ H02M 3/156; H02M 2003/1557; H02M 2001/0003; H02M 2001/0009; H02M 7/217
See application file for complete search history.

(56) References Cited

U.S. PATENT DOCUMENTS

| 6,944,034 B1 * | 9/2005 | Shteynberg ......... H02M 1/4258 323/282 |
| RE42,946 E * | 11/2011 | Chen ...................... G05F 1/70 323/222 |
| 8,248,041 B2 * | 8/2012 | Rausch ............... H02M 1/4225 323/207 |

OTHER PUBLICATIONS

"ICL8201, AC/DC Buck Controller with PFC for LED Lamps," Infineon, Power Management & Multimarket, Data Sheet, Revision V2.0, May 25, 2015, 40 pp.

* cited by examiner

*Primary Examiner* — Gary L Laxton
(74) *Attorney, Agent, or Firm* — Shumaker & Sieffert, P.A.

(57) ABSTRACT

Methods, devices, techniques, systems, and integrated circuits are disclosed for variably controlling a switch on time for a driver, which may enhance iTHD. In one example, a device includes an input voltage sensor configured to detect an input voltage, and a variable switch on time generator, operatively connected to the input voltage sensor to receive a signal indicative of the input voltage. The variable switch on time generator is configured to determine a variable switch on time based at least in part on the detected input voltage, and output the determined variable switch on time for controlling switch on timing of a driver switch.

17 Claims, 5 Drawing Sheets

— 1 —
BUCK CONVERTER ELECTRONIC DRIVER WITH ENHANCED ITHD

TECHNICAL FIELD

This disclosure relates to electronic drivers, and in particular, to electronic drivers with DC-DC buck converters.

BACKGROUND

Electrical power converters are used to meet specialized current and voltage requirements of a load with the available source power. Buck converters are popular for use in electronic drivers in a variety of applications, such as light-emitting diode (LED) lighting. For example, chains of LEDs may require a certain DC voltage and current for proper operation. LED chains may typically be powered with two-stage control gear including an AC-DC voltage converter and a DC-DC current converter, typically a step-down or buck converter with a lower output voltage than input voltage. Buck converters typically offer advantages such as low component count, low cost, and high efficiency.

SUMMARY

In general, various examples of this disclosure are directed to techniques and methods for a buck converter with enhanced total harmonic distortion in current (iTHD) for electronic drivers. Despite certain advantages, typical buck drivers have poor iTHD (e.g., ~13%-26%) when operating with low output voltage and high AC mains power, due to filter-induced phase latency between the driver input current and input voltage. Various examples of this disclosure may combine the traditional advantages of buck drivers with enhanced iTHD as well. Some traditional driver designs have sought to address THD with an enhanced electromagnetic interference (EMI) filter or an enhanced capacitor-input (pi) filter. However, these solutions tend to be bulky, impact power factor and output current ripple, and only have limited success in managing THD.

Instead, various examples of this disclosure may enhance iTHD by incorporating an input voltage sensor and a variable switch on time generator that may vary a switch on time based on the input voltage detected by the input voltage sensor. The input voltage sensor and the variable switch on time generator may thereby implement a current waveform shaping function on the current received at the input prior to supplying the current to a load. The input current waveform shaping function of this disclosure may involve varying the power switching time relative to the input voltage, as further described below. Examples of this disclosure may improve iTHD in a way that may also enhance power factor (PF). Examples of this disclosure may thus combine advantages of a buck converter with enhanced iTHD while avoiding the drawbacks of relying on an enhanced EMI filter or enhanced pi filter.

One example is directed to a device that includes an input voltage sensor configured to detect an input voltage, and a variable switch on time generator, operatively connected to the input voltage sensor to receive a signal indicative of the input voltage. The variable switch on time generator is configured to: determine a variable switch on time based at least in part on the detected input voltage; and output the determined variable switch on time for controlling switch on timing of a driver switch.

Another example is directed to a method including detecting an input voltage; determining a variable switch on time based at least in part on the detected input voltage; and outputting the determined switch on time for controlling switch on timing of a driver switch.

Another example is directed to system configured to detect an input voltage; determine a variable switch on time based at least in part on the detected input voltage; and output the determined switch on time for controlling switch on timing of a driver switch.

The details of one or more examples of this disclosure are set forth in the accompanying drawings and the description below. Other features, objects, and advantages will be apparent from the description and drawings, and from the claims.

DETAILED DESCRIPTION

Figure 1:
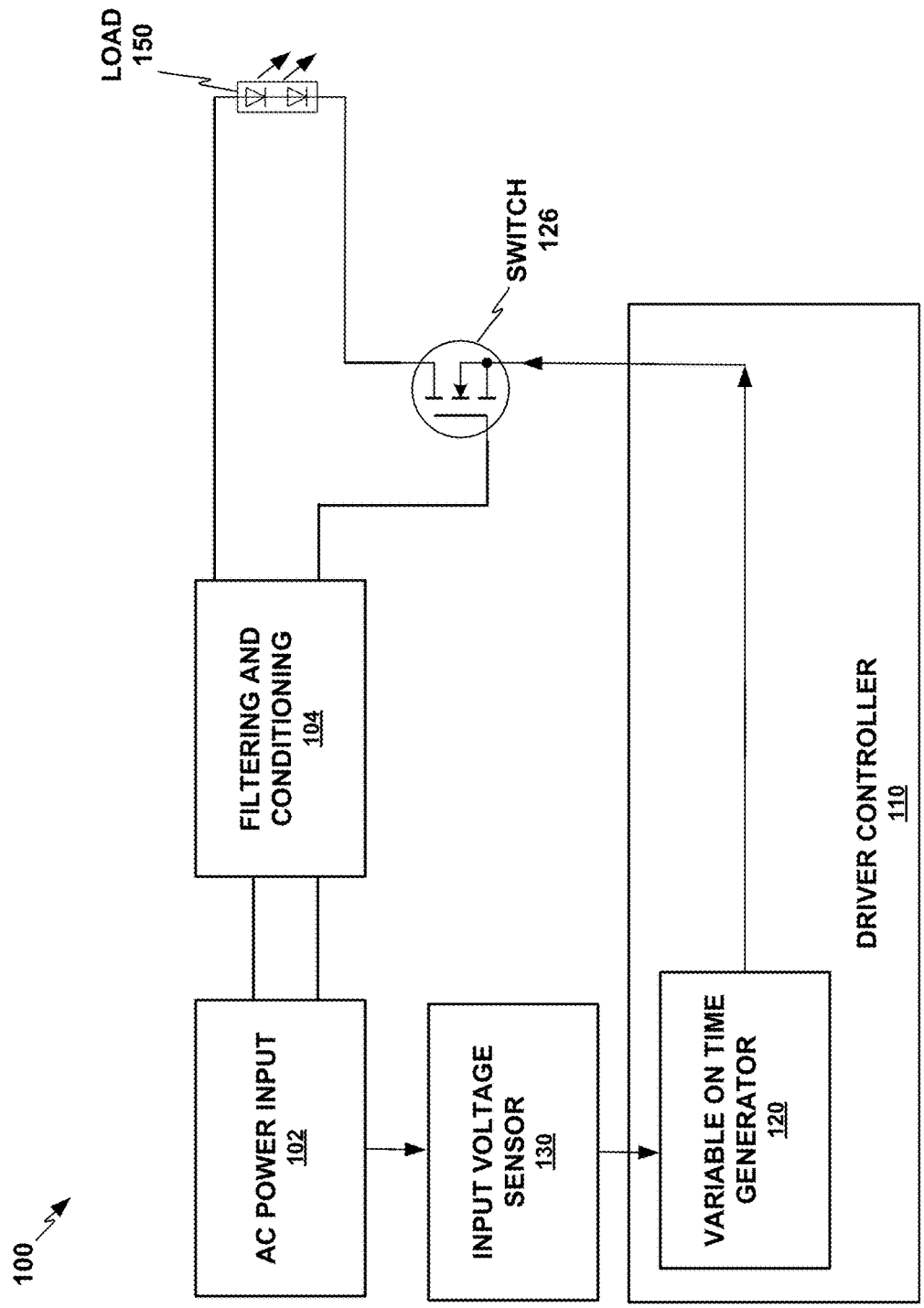
FIG. 1 is a conceptual block diagram of an electronic driver with a driver controller that includes an input voltage responsive variable switch on time generator ("variable on time generator"), and an input voltage sensor operatively connected to variable on time generator to signal a detected input voltage to variable on time generator, in one aspect of this disclosure.

FIG. 1 is a conceptual block diagram of an electronic driver 100 with a driver controller 110 that includes an input voltage responsive variable switch on time ($T_{ON}$) generator 120 ("variable on time generator 120"), and an input voltage sensor 130 operatively connected to variable on time generator 120 to signal a detected input voltage to variable on time generator 120, in one aspect of this disclosure. Electronic driver also includes 100 AC power input terminal 102 and a filtering and conditioning block 104 connected to drive filtered and conditioned electrical power to a load 150, such as a chain of LEDs. Filtering and conditioning block 104 may include, for example, an EMI filter, a pi filter, an input smoothing capacitor, and/or an AC-DC current rectifier. Driver 100 may thus deliver a smoothed DC current to load 150.

Variable on time generator 120 is connected to input voltage sensor 130 in a configuration such that variable on time generator 120 may receive an input from input voltage sensor 130 indicative of an input voltage at AC power input terminal 102, and may control the switch on timing of switch 126 of driver 100 with variable on times based on the input voltage. Switch 126 may be a metal-oxide semiconductor field effect transistor (MOSFET) or other semiconductor switch configured to control switching a current on and off in response to a switch on signal, in various examples.

Variable on time generator 120 may apply a higher switch on time, or $T_{ON}$ time, when the sensed input voltage is high, leading to a higher current draw by load 150 from AC power input 102 during a high-voltage portion of the AC cycle of the input voltage. Conversely, variable on time generator 120 may apply a lower switch on time when the sensed input voltage is low, leading to a lower current draw by load 150 from AC power input 102 during a low-voltage portion of the AC cycle of the input voltage. By doing so, variable on time generator 120 may shape the current waveform from its initial shape as received via AC power input 102, and reduce one or more higher-order harmonics in the current, thus reducing and enhancing the iTHD, prior to supplying the current to load 150. Variable on time generator 120 may also limit the lower variations in switch on time to a minimum switch on time, to ensure sufficient current for proper operation of load 150, such as to avoid human-perceptible flicker in an LED lighting application, for example.

For example, variable on time generator 120 may be configured to determine a variable switch on time to be proportional to the input voltage, and to output a control signal for a switch on time that is proportional to the input voltage. In some examples, variable on time generator 120 may also enforce a threshold minimum switch on time regardless of the input voltage once the input voltage is below a threshold minimum voltage. In such examples, variable on time generator 120 may be configured to determine the variable switch on time to be proportional to the input voltage when the input voltage is above the threshold minimum voltage, and to determine the variable switch on time to be constant at a threshold minimum switch on time when the input voltage is below the threshold minimum voltage. Aspects of driver 100 with variable on time generator 120 are further described with reference to various examples below.

Figure 2:
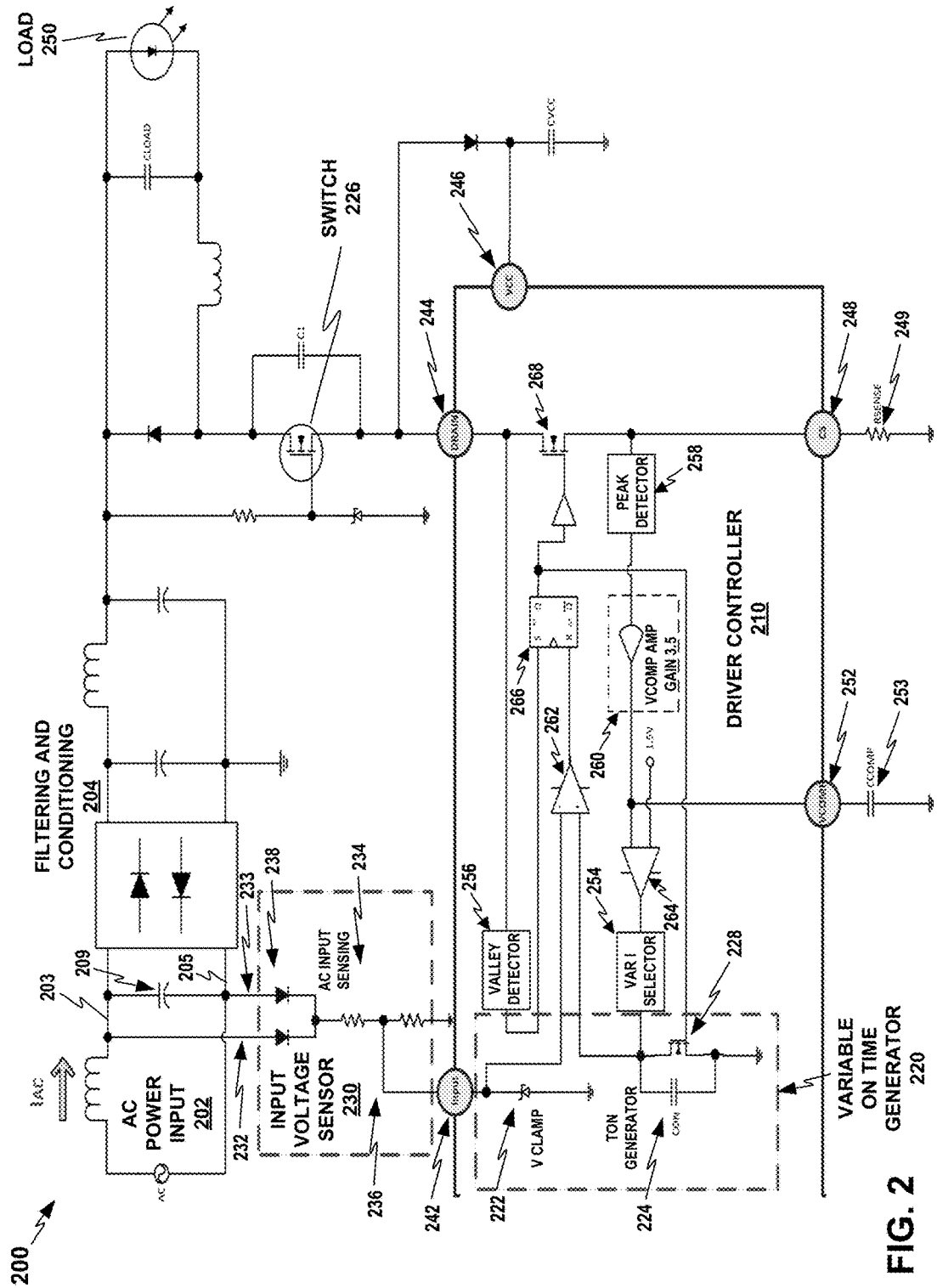
FIG. 2 is a more detailed conceptual block diagram of an electronic driver with a variable on time generator and an input voltage sensor, in one aspect of this disclosure.

FIG. 2 is a more detailed conceptual block diagram of an electronic driver 200 with a variable on time generator 220 and an input voltage sensor 230, in one aspect of this disclosure. Driver 200 of FIG. 2 may be an implementation of electronic driver 100 shown in FIG. 1. In FIG. 2, electronic driver 200 also includes an AC power input 202, a filtering and conditioning block 204, a driver controller 210, and a switch 226 that are analogous to their counterparts described above with reference to FIG. 1. Switch 226 may be a metal-oxide semiconductor field effect transistor (MOSFET) or other semiconductor switch configured to control switching a current on and off in response to a switch on signal, in various examples. Driver 200 drives a load 250, such as a chain of LED lights, analogously to driver 100 driving load 150 as shown in FIG. 1.

Analogously to FIG. 1, filtering and conditioning block 204 may include, for example, an EMI filter, a pi filter, an input smoothing capacitor, and/or an AC-DC current rectifier. Driver 200 may thus deliver a smoothed DC current to load 250, with timing of the supply of current to load 250 controlled via switch 226. The timing of switch 226 in turn is controlled by driver controller 210, which includes variable on time generator 220 in operative communication with input voltage sensor 230. Driver controller 210 may further include additional features and components and implement additional functions as described below.

Driver 200 as illustrated in FIG. 2 shows further detail on how input voltage sensor 230 may detect the input voltage of AC power input 202 and output a signal indicative of input voltage of AC power input 202 to variable on time generator 220. Driver 200 as illustrated in FIG. 2 also shows further detail on how variable on time generator 220 may receive the signal indicative of the input voltage of AC power input 202 from input voltage sensor 230, and how variable on time generator 220 may be configured to determine a switch on time based at least in part on the input voltage, and output the determined switch on time to switch 226. Variable on time generator 220 may cause switch 226 to switch on for longer on times proportionally to higher input voltages, at least during part of an AC half-cycle of input voltages. Variable on time generator 220 may thus shape the waveform of the current received via AC power input 202 before delivering the waveform-shaped current to load 250 by driver 200, thereby causing an enhanced, lower iTHD and enhanced power factor, among other advantages.

Input voltage sensor 230 may be implemented with an input pin 232, a resistor ladder 234, and a sampling pin 236, in this example. Input voltage sensor 230 may receive the voltage of AC power input 202 via input pin 232, pass the input voltage through resistor ladder 234, and sample a voltage at sampling pin 236. Resistor ladder 234 may be tuned or adjusted to adjust iTHD performance of driver 200. Resistor ladder 234 is illustratively depicted as including two resistors in FIG. 2, one on either side of sampling pin 232, but may include any number and arrangement of resistors in other examples. Resistor ladder 234 may be tuned or adjusted by tuning or adjusting the resistance values, number, and/or arrangement of its constituent resistors, for example.

Input voltage sensor 230 may also include minimum voltage clamp 238 applied to input pin 232. Minimum voltage clamp 238 may contribute to ensuring a minimum voltage detected and signaled by input voltage sensor 230, independently of the voltage at AC power input 202 if the voltage at AC power input 202 falls below a certain minimum threshold voltage that may be defined or implemented by minimum voltage clamp 238. In the example depicted in FIG. 2, minimum voltage clamp 238 is implemented with parallel, isotropic diodes disposed on input pin 232 and on alternative input pin 233. Input pin 232 is coupled simply to the high voltage side 203 of AC power input 202, with its diode admitting current from AC power input 202. Alternative input pin 233 is coupled via its diode to the low voltage side 205 of AC power input 202, and thereby to a capacitor that is also coupled on its opposing side to high voltage side 203 of AC power input 202. Minimum voltage clamp 238 is thus implemented to draw at least a minimum voltage from AC power input 202, regardless of the voltage at the high side of AC power input 202.

Minimum voltage clamp 238 thus includes input pin 232 coupled to high voltage side 203 of AC power input 202, and alternative input pin 233 coupled at least in part to low voltage side 205 of AC power input 202. Alternative input pin 233 is coupled at least in part to the low voltage side of AC power input 202 inasmuch as it is also coupled to capacitor 209 which is coupled on its opposing side to high side 203 of AC power input 202, in the example of FIG. 2. This is one more particular example of how minimum voltage clamp 238 may be implemented to draw at least a minimum voltage from AC power input 202, regardless of the voltage at the high side of AC power input 202. Thus, minimum voltage clamp 238 of input voltage sensor 230 may clamp a minimum threshold voltage in alternative to the input voltage, and determine the variable switch on time based on the minimum threshold voltage in response to the input voltage falling below the minimum threshold voltage, in some examples.

Variable on time generator as implemented in the example of FIG. 2 includes a voltage clamp 222, an on time measurement capacitor 224, and a switch (e.g., MOSFET) 228, interconnected as depicted in FIG. 2. Driver controller 210 further includes components and features such as controller input pin 242; a drain pin 244; a supply voltage ($V_{CC}$) pin 246; an output (CS) pin 248 coupled to a current sense resistor 249; a voltage comparison pin 252 coupled to a current comparison capacitor 253; a variable current selection unit 254; a valley detector 256; a peak detector 258; a voltage comparison amplifier 260; operational amplifiers (op amps) 262 and 264; a set-reset latch 266 ("latch 266"); and a switch (e.g., MOSFET) 268, interconnected as depicted in FIG. 2. Driver controller 210 may thus implement supply of a switch on time to switch 226 based on the detection of the input voltage and operation of generating variable switch on time by input voltage sensor 230 and variable on time generator 220. Various implementations may also include additional features or components besides those shown in FIG. 2 and described herein, and/or may omit one or more of the illustrative features and components of driver controller 210 as shown in FIG. 2 and described herein.

As shown in FIG. 2, variable on time generator 220 may receive a voltage signal indicative of the input voltage from input voltage sensor 230 via controller input pin 242. Variable on time generator 220 may use the voltage or voltage signal at controller input pin 242 as a reference voltage. Voltage clamp 222 of variable on time generator 220 is coupled to controller input pin 242 and to one input of op amp 262. The other input of op amp 262 is coupled to on time measurement capacitor 224 and one input of switch 228 of variable on time generator 220. The output of op amp 262 is coupled to a reset pin of latch 266, while valley detector 256 is coupled to the set pin of latch 266. Valley detector 256 may detect a minimum output voltage.

Voltage comparison pin 252 is coupled to voltage comparison amplifier 260 and to one input of op amp 264. Voltage comparison amplifier 260 may have a gain of 3.5 as shown in the example of FIG. 2, and may have a gain of a higher or lower value in other examples. Peak detector 258 is coupled to voltage comparison amplifier 260. Peak detector 258 may detect a peak output voltage. The other input of op amp 264 is coupled to a reference voltage, which is 1.5 volts as shown in the example of FIG. 2, and may have a higher or lower value in other embodiments.

Op amp 264 is coupled to variable current selection unit 254, which in turn is coupled to on time measurement capacitor 224 and switch 228 of variable on time generator 220 and to the corresponding input of op amp 262. Variable on time generator 220 may thus use a variable current that is dependent on a voltage level via voltage comparison pin 252 to charge up on time measurement capacitor 224. When the voltage at the on time measurement capacitor 224 reaches the voltage level of controller input pin 242, variable on time controller 220 causes the gate of switch 228 of variable on time generator 220 to turn off, thereby controlling the signal timing of controller 210.

The output of latch 266 is coupled to switch 268 of controller 210, which in turn is coupled to drain 244 and thereby to switch 226 of driver 200. The output of latch 266 is also coupled to switch 228 of variable on time controller 220. Controller 210 and variable on time generator 220 may thus implement variable switching times of switch 226 of driver 200 based on the detected input voltage at AC power input 202 as sensed by input voltage sensor 230, and proportional to the detected input voltage across at least a portion of the voltage range of the input voltage. Controller 210, variable on time generator 220, and input voltage sensor 230 may thus regulate the output current of driver 200, with reference to current comparison capacitor 253, and ensure that driver 200 supplies load 250 with current proportional to the input voltage, at least across a portion of the input voltage range. Controller 210, variable on time generator 220, and input voltage sensor 230 may also be implemented in a variety of other ways and with other specific features, components, and interconnections among them in other examples.

Figure 3:
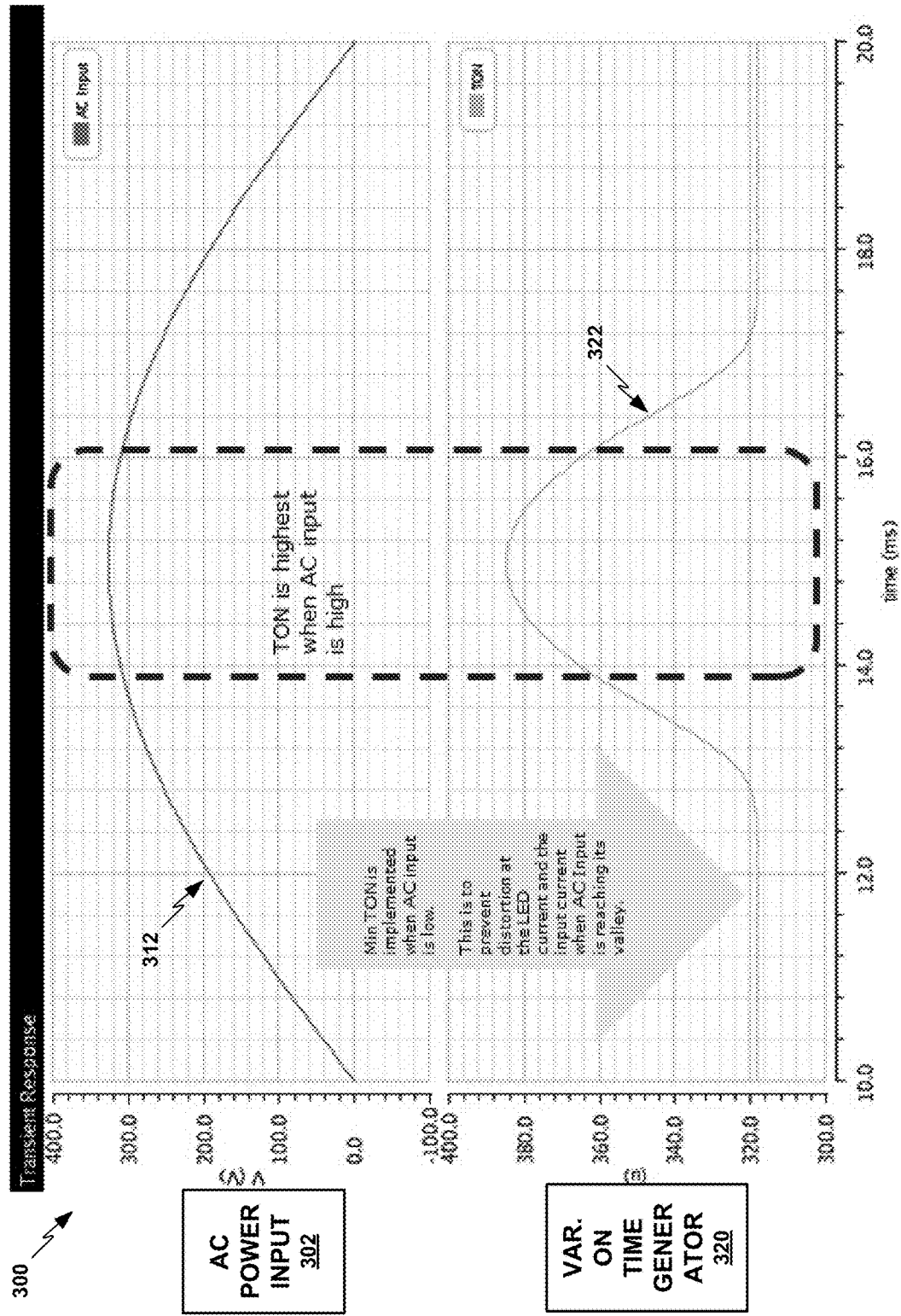
FIG. 3 shows a graph of input voltage and switch on time over time during one AC half-cycle of an AC power input, where the switch on time is controlled by a variable on time generator based at least in part on the input voltage, in one aspect of this disclosure.

FIG. 3 shows a graph 300 of input voltage 312 and switch on time 322 over time during one AC half-cycle of an AC power input 302, where switch on time 322 is controlled by a variable on time generator 320 based at least in part on the input voltage 312, in one aspect of this disclosure. Input voltage 312 oscillates from 0 to 330 volts and back again, as shown relative to the upper y axis, and switch on time 322 is varied under control of variable on time generator 320 between 320 and 385 microseconds in this example, as shown relative to the lower y axis, both over an AC half-cycle duration of 10 milliseconds, as shown relative to the x axis.

In the example of FIG. 3, variable on time generator 320 enforces a threshold minimum on time of 320 microseconds at times that input voltage 312 falls below a threshold minimum voltage of 220 volts. The threshold minimum voltage is a threshold minimum as observed by variable on time generator 320, and not by AC power input 302, for purposes of enforcing the threshold minimum on time. When input voltage 312 is above the threshold minimum voltage of 220 volts, variable on time generator 320 controls the switch on time 322 to vary proportionally with input voltage 312, such that as input voltage 312 rises and falls, switch on time 322 rises and falls in proportion with input voltage 312. In this example, variable on time generator 320 controls switch on time 322 to rise from the threshold minimum on time of 320 microseconds up to a peak on time of 385 microseconds, in tandem with input voltage rising from the threshold minimum voltage of 220 volts to a peak voltage of 330 volts. Switch on time 322 may also have a brief sigmoidal transition between the constant portion and the proportional portion of switch on time 322, and the transition from proportional portion back to constant portion of switch on time 322. Variable on time generator 320 may thus advantageously raise the switch on time 322 and the resulting current delivered to a load proportionately to higher levels of input voltage 312, while still maintaining sufficient current delivered to the load during times of lower levels of input voltage 312. Variable on time generator 320 may thus inhibit one or more higher harmonics in the current and reduce iTHD.

In theory, the iTHD is commonly defined as the ratio of the root mean square (RMS) amplitude of a set of higher harmonic frequencies to the RMS amplitude of the first harmonic, or fundamental, frequency. The formula for iTHD is given below:

$$iTHD = \frac{\sqrt{I_2^2 + I_3^2 + I_4^2 + \ldots + I_N^2}}{I_1} \quad \text{(Equation 1)}$$

where I is the RMS current of the Nth harmonic and N=1 is the fundamental harmonic. In some typical drivers, current passes from the input through an EMI filter and a pi filter with a bulk capacitor to the load, which causes the current to be out of phase with the voltage, and diverts a substantial amount of the energy in the current into higher order harmonics of the current, particularly the first one or more harmonics, thereby causing relatively high iTHD. In contrast, as shown in FIG. 3, variable on time generator 320 may shape the current waveform delivered to the load and inhibit one or more higher harmonics in the current and reduce iTHD, as further demonstrated in FIG. 4.

Figure 4:
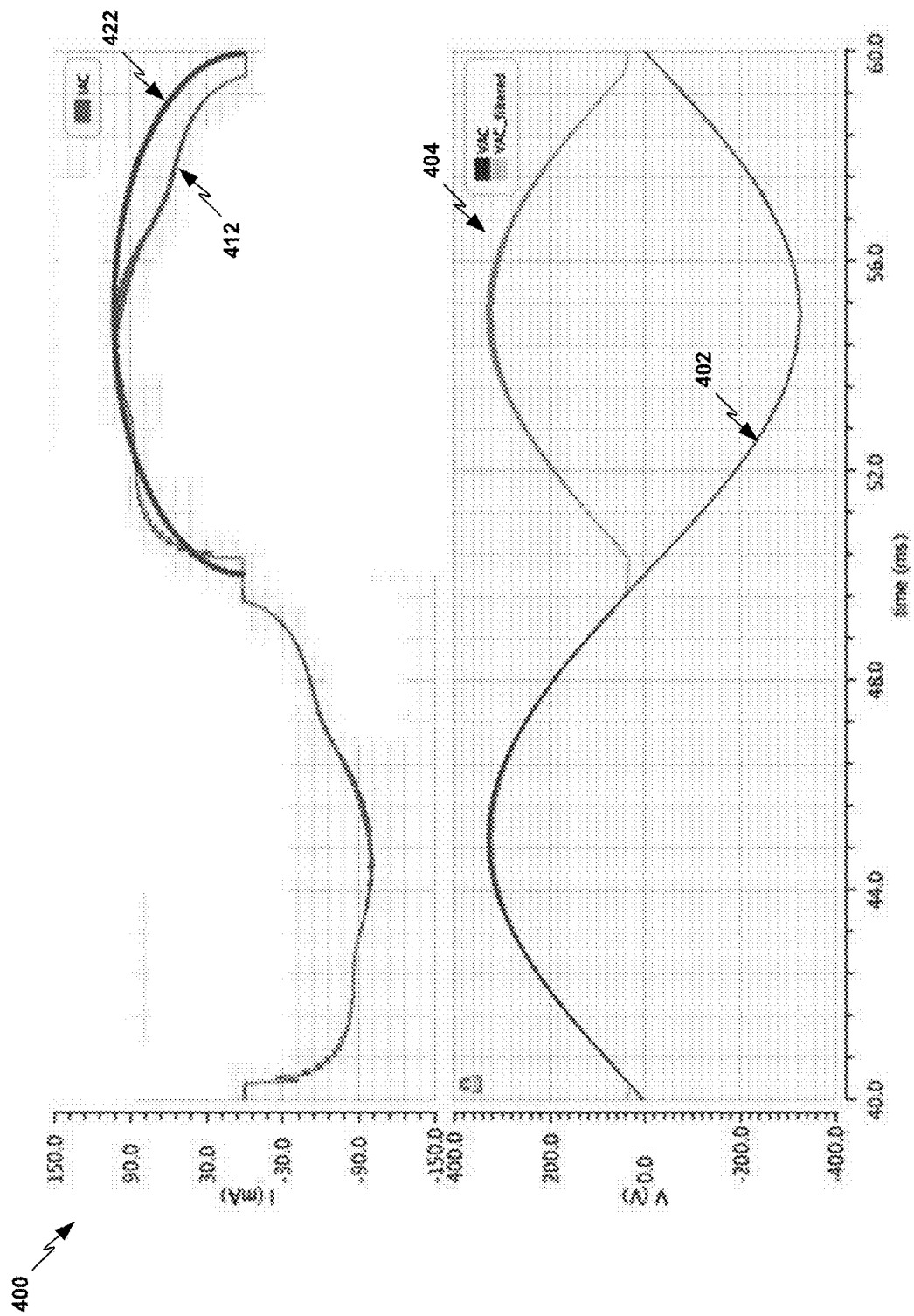
FIG. 4 shows a graph comparing a driver current over time of a traditional buck converter driver, and a driver current over time resulting from the operation of a variable on time generator of this disclosure, for one full AC input cycle, in one aspect of this disclosure.

FIG. 4 shows a graph 400 comparing a driver output current 412 over time of a traditional buck converter driver, and a driver output current 422 over time resulting from the operation of a variable on time generator of this disclosure, for one full AC input cycle, in one aspect of this disclosure. Graph 400 also shows an original AC input voltage 402 and a rectified AC input voltage 404 over a corresponding AC input cycle for comparison. Driver output current 412 of a traditional buck converter driver displays a substantially uneven shape relative to a sine wave, indicative of significant current-voltage phase latency, substantial higher-order current harmonics, and relatively high iTHD.

On the other hand, driver output current 422 resulting from the operation of a variable on time generator of this disclosure (e.g., variable on time generator 120, 220, 320), in cooperation with direct sensing of the input voltage via an input voltage sensor of this disclosure (e.g., input voltage sensor 130, 230), shows substantially closer adherence to an ideal sine wave shape, indicative of lower current-voltage phase latency, reduced higher-order current harmonics, and relatively low iTHD. As a particular example, some implementations of this disclosure may particularly substantially reduce energy in the third current harmonic ($I_3$). Some implementations of this disclosure may particularly substantially reduce energy in both the third and fifth current harmonics ($I_3$ and $I_5$). Other implementations may significantly reduce energy across a wide variety of current harmonics in favor of the fundamental frequency.

When the detected input voltage sensed by the input voltage sensor and communicated to the variable on time generator is relatively high, the variable on time generator causes the switch on time to be relatively high, leading to more current drawn from the AC power input. On the other hand, when the detected input voltage sensed by the input voltage sensor and communicated to the variable on time generator is relatively low, the variable on time generator causes the switch on time to be relatively low, leading to less current drawn from the AC power input. Driver output current 422 resulting from the operation of a variable on time generator of this disclosure may thus shape the waveform of driver output current 422 and reduce distortion in the output current due to voltage-current phase lag.

As in the example of FIG. 3, the variable on time generator may also enforce a minimum switch on time to ensure that crossover distortion is not worsened, and that current supplied to the load does not fall below a minimum threshold. The minimum threshold may be set or selected based on the operating parameters of the load. For example, the load may be an LED chain, and the minimum threshold may be set or selected to ensure that the current supplied to the LED chain does not fall low enough to cause any human-perceptible flickering or faltering of the light emitted by the LED chain.

Figure 5:
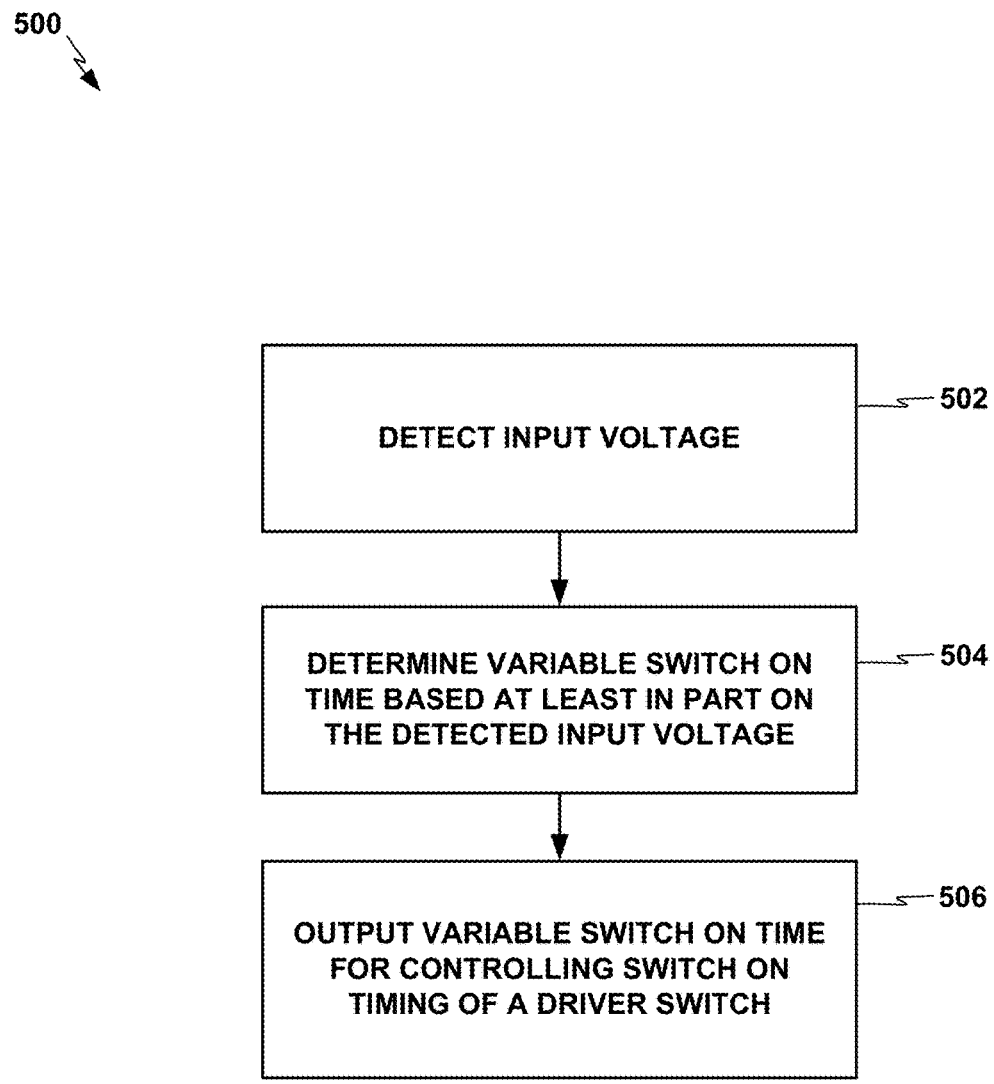
FIG. 5 is a flowchart illustrating a method of operating an input voltage sensor and a variable on time generator of this disclosure in a way that may better synchronize output current with input voltage, reduce higher-order current harmonics, and reduce iTHD, among other advantages, in one aspect of this disclosure.

FIG. 5 is a flowchart illustrating a method 500 of operating an input voltage sensor and a variable on time generator of this disclosure in a way that may better synchronize output current with input voltage, reduce higher-order current harmonics, and reduce iTHD, among other advantages, in one aspect of this disclosure. Method 500 may be a more generalized form of the operation of various input voltage sensors and/or variable on time generators of this disclosure, including a generalized form of the operation of input voltage sensors 130 and 230 and/or variable on time generators 120, 220, and 320, including in producing switch on time 322 and/or output current 422, as described above with reference to FIGS. 1-4.

In the example of FIG. 5, method 500 includes detecting an input voltage (e.g., input voltage sensors 130 or 230 detecting the input voltage of AC power input 102 or 202 as described with reference to FIGS. 1 and 2) (502). Method 500 further includes determining a variable switch on time based at least in part on the detected input voltage (e.g., variable on time generators 120, 220, or 320 determining a variable switch on time based at least in part on the detected input voltage indicated by input voltage sensors 130 or 230, and potentially also based on a constant threshold minimum switch on time at times when the input voltage is below a threshold minimum voltage, as described with reference to FIGS. 1-4) (504). Method 500 further includes outputting the determined switch on time for controlling switch on timing of a driver switch (e.g., variable on time generators 120, 220, or 320 outputting a switch on timing signal for communication to switch 126 or 226, potentially by way of additional processing functions performed by other components of a driver controller 110 or 210 as shown particularly in FIG. 2, resulting in switch on times characterized by graphs 300 and 400 of FIGS. 3 and 4) (506).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

For example, a variable on time generator and/or an input voltage sensor of this disclosure (e.g., variable on time generators 120, 220, or 320, input voltage sensors 130 or 230) may be implemented or embodied with one or more integrated circuits configured, via any combination of hardware, logic, general purpose processors, application specific integrated circuits (ASICs), field programmable gate arrays (FPGAs), and/or general processing circuits, which may execute software instructions in some examples, to perform various functions described herein. A variable on time generator and/or an input voltage sensor of this disclosure may also be configured with various other circuit elements and with operative connections therebetween. The integrated circuits and other circuit elements may be configured to perform any of the functions or processes described above.

Additional aspects of this disclosure are enumerated as follows as aspects A1-A20.

A1. In one aspect A1 of this disclosure, a device includes an input voltage sensor configured to detect an input voltage; and a variable switch on time generator, operatively connected to the input voltage sensor to receive a signal indicative of the input voltage, the variable switch on time generator configured to: determine a variable switch on time based at least in part on the detected input voltage; and output the determined variable switch on time for controlling switch on timing of a driver switch.

A2. A device of aspect A1, wherein the variable switch on time generator is further configured to determine the variable switch on time to be proportional to the input voltage for at least a portion of an alternating current (AC) cycle of the input voltage.

A3. A device of aspect A1 or A2, wherein the input voltage sensor and the variable switch on time generator are further configured to determine the variable switch on time to be proportional to the input voltage at times that the input voltage is above a threshold minimum voltage, and to determine the variable switch on time to be constant at a threshold minimum switch on time at times that the input voltage is below the threshold minimum voltage.

A4. A device of any of aspects A1-A3, wherein the input voltage sensor comprises a minimum voltage clamp coupled to a power input, wherein the minimum voltage clamp configures the input voltage sensor to output a signal indicative of a minimum threshold voltage to the variable switch on time generator in response to the input voltage falling below a minimum threshold voltage.

A5. A device of any of aspects A1-A4, wherein the minimum voltage clamp comprises an input pin coupled to a high voltage side of the power input, and an alternative input pin coupled at least in part to a low voltage side of the power input.

A6. A device of any of aspects A1-A5, wherein the alternative input pin is coupled via the low voltage side of the power input to a capacitor that is coupled on its opposing side to the high voltage side of the power input.

A7. A device of any of aspects A1-A6, wherein the variable on time generator comprises an on time measurement capacitor and a controller input pin, wherein the variable on time generator is configured to charge the on time measurement capacitor via the voltage comparison pin until the on time measurement capacitor reaches a voltage level of the controller input pin.

A8. In another aspect A8 of this disclosure, a method includes detecting an input voltage; determining a variable switch on time based at least in part on the detected input voltage; and outputting the determined switch on time for controlling switch on timing of a driver switch.

A9. A method of aspect A8, further comprising determining the variable switch on time to be proportional to the input voltage for at least a portion of an alternating current (AC) cycle of the input voltage.

A10. A method of aspects A8 or A9, wherein determining the variable switch on time further includes: determining the variable switch on time to be proportional to the input voltage at times that the input voltage is above a threshold minimum voltage; and determining the variable switch on time to be constant at a threshold minimum switch on time at times that the input voltage is below the threshold minimum voltage.

A11. A method of any of aspects A8-A10, further including: clamping a minimum threshold voltage in alternative to the input voltage; and determining the variable switch on time based on the minimum threshold voltage in response to the input voltage falling below the minimum threshold voltage.

A12. A method of any of aspects A8-A11, wherein clamping the minimum threshold voltage comprises receiving a voltage from a high voltage side of a power input, and receiving an alternative voltage at least in part from a low voltage side of the power input.

A13. A method of any of aspects A8-A12, wherein receiving an alternative voltage further comprises receiving a voltage from a capacitor that is coupled on its opposing side to the high voltage side of the power input.

A14. A method of any of aspects A8-A13, wherein determining the variable switch on time based at least in part on the detected input voltage further comprises charging an on time measurement capacitor via a voltage comparison pin until the on time measurement capacitor reaches the detected input voltage.

A15. In another aspect A15 of this disclosure, a system is configured to: detect an input voltage; determine a variable switch on time based at least in part on the detected input voltage; and output the determined switch on time for controlling switch on timing of a driver switch.

A16. A system of aspect A15, comprising an input voltage sensor configured to detect the input voltage.

A17. A system of aspects A15 or A16, comprising a variable switch on time generator, operatively connected to the input voltage sensor to receive a signal indicative of the input voltage, the variable switch on time generator configured to determine the variable switch on time based at least in part on the detected input voltage, and output the determined switch on time for controlling switch on timing of a driver switch.

A18. A system of any of aspects A15-A17, wherein the system is further configured to determine the variable switch on time to be proportional to the input voltage for at least a portion of an alternating current (AC) cycle of the input voltage.

A19. A system of any of aspects A15-A18, wherein the system is further configured such that determining the variable switch on time further comprises:

determining the variable switch on time to be proportional to the input voltage at times that the input voltage is above a threshold minimum voltage; and determining the variable switch on time to be constant at a threshold minimum switch on time at times that the input voltage is below the threshold minimum voltage.

A20. A system of any of aspects A15-A19, wherein the variable on time generator comprises an on time measurement capacitor and a controller input pin, wherein the variable on time generator is configured to charge the on time measurement capacitor via the voltage comparison pin until the on time measurement capacitor reaches a voltage level of the controller input pin.

Various examples of the invention have been described. These and other examples are within the scope of the following claims.

What is claimed is:
1. A device comprising:
an input voltage sensor configured to detect an input voltage; and
a variable on time generator comprising an on time measurement capacitor, a controller input pin, and a voltage comparison pin, wherein the variable on time generator is operatively connected to the input voltage sensor via the controller input pin to receive a signal indicative of the input voltage, and the variable on time generator is configured to:
determine a variable switch on time based at least in part on the detected input voltage, wherein determining the variable switch on time comprises charging the on time measurement capacitor via the voltage comparison pin until the on time measurement capacitor reaches a voltage level of the controller input pin; and generate an output based on the determined variable switch on time for controlling switch on timing of a driver switch.

2. The device of claim 1, wherein the variable on time generator is further configured to determine the variable switch on time to be proportional to the input voltage for at least a portion of an alternating current (AC) cycle of the input voltage.

3. The device of claim 1, wherein the input voltage sensor and the variable on time generator are further configured to determine the variable switch on time to be proportional to the input voltage at times that the input voltage is above a threshold minimum voltage, and to determine the variable switch on time to be constant at a threshold minimum switch on time at times that the input voltage is below the threshold minimum voltage.

4. The device of claim 1, wherein the input voltage sensor comprises a minimum voltage clamp coupled to a power input, wherein the minimum voltage clamp configures the input voltage sensor to output a signal indicative of a minimum threshold voltage to the variable on time generator in response to the input voltage falling below the minimum threshold voltage.

5. The device of claim 4, wherein the minimum voltage clamp comprises an input pin coupled to a high voltage side of the power input, and an alternative input pin coupled at least in part to a low voltage side of the power input.

6. The device of claim 5, wherein the alternative input pin is coupled via the low voltage side of the power input to a capacitor that is coupled on its opposing side to the high voltage side of the power input.

7. A method comprising:
detecting an input voltage;
determining a variable switch on time based at least in part on the detected input voltage, wherein determining the variable switch on time based at least in part on the detected input voltage further comprises charging an on time measurement capacitor via a voltage comparison pin until the on time measurement capacitor reaches the detected input voltage; and
generating an output based on the determined switch on time for controlling switch on timing of a driver switch.

8. The method of claim 7, further comprising determining the variable switch on time to be proportional to the input voltage for at least a portion of an alternating current (AC) cycle of the input voltage.

9. The method of claim 7, wherein determining the variable switch on time further comprises:
determining the variable switch on time to be proportional to the input voltage at times that the input voltage is above a threshold minimum voltage; and
determining the variable switch on time to be constant at a threshold minimum switch on time at times that the input voltage is below the threshold minimum voltage.

10. The method of claim 7, further comprising:
clamping a minimum threshold voltage in response to the input voltage falling below the minimum threshold voltage; and
determining the variable switch on time based on the minimum threshold voltage.

11. The method of claim 10, wherein clamping the minimum threshold voltage comprises receiving a voltage from a high voltage side of a power input, and receiving an alternative voltage at least in part from a low voltage side of the power input.

12. The method of claim 11, wherein receiving an alternative voltage further comprises receiving a voltage from a capacitor that is coupled on an opposing side of the capacitor to the high voltage side of the power input.

13. A system comprising:
an on time measurement capacitor;
a controller input pin; and
a voltage comparison pin,
wherein the system is configured to:
detect an input voltage;
determine a variable switch on time based at least in part on the detected input voltage, wherein determining the variable switch on time based at least in part on the detected input voltage comprises charging the on time measurement capacitor via the voltage comparison pin until the on time measurement capacitor reaches a voltage level of the controller input pin; and
generate an output based on the determined switch on time for controlling switch on timing of a driver switch.

14. The system of claim 13, comprising an input voltage sensor configured to detect the input voltage.

15. The system of claim 13, comprising a variable switch on time generator, operatively connected to the input voltage sensor to receive a signal indicative of the input voltage, the variable switch on time generator configured to determine the variable switch on time based at least in part on the detected input voltage, and output the determined switch on time for controlling switch on timing of a driver switch.

16. The system of claim 13, wherein the system is further configured to determine the variable switch on time to be proportional to the input voltage for at least a portion of an alternating current (AC) cycle of the input voltage.

17. The system of claim 13, wherein the system is further configured such that determining the variable switch on time further comprises:
determining the variable switch on time to be proportional to the input voltage at times that the input voltage is above a threshold minimum voltage; and
determining the variable switch on time to be constant at a threshold minimum switch on time at times that the input voltage is below the threshold minimum voltage.

* * * * *